(No Model.) 4 Sheets—Sheet 2.
T. A. ZELLERS & S. R. BLANCHARD.
CONVEYER FOR CARRYING GLASS FROM FLATTENING OVENS.
No. 573,318. Patented Dec. 15, 1896.
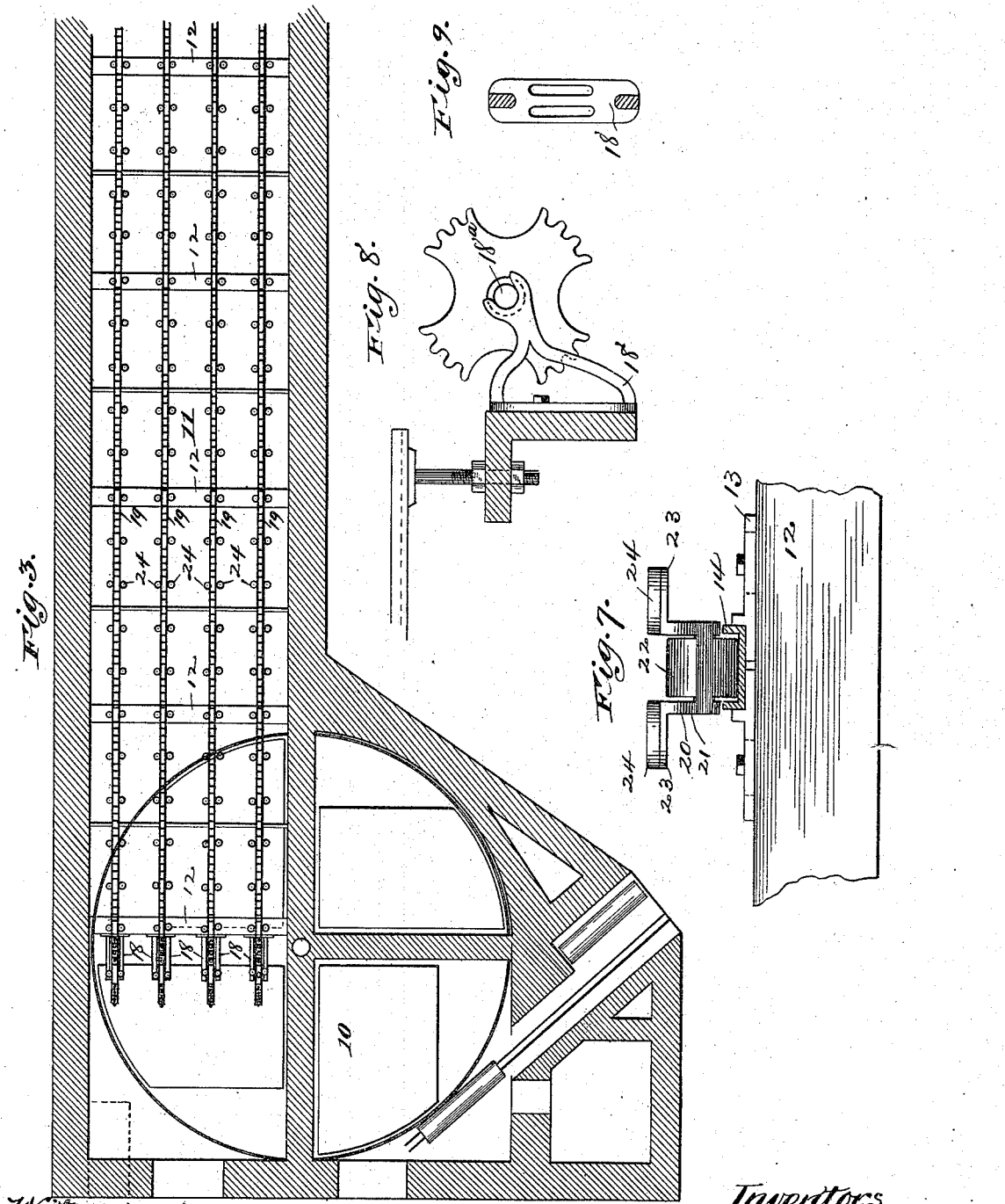

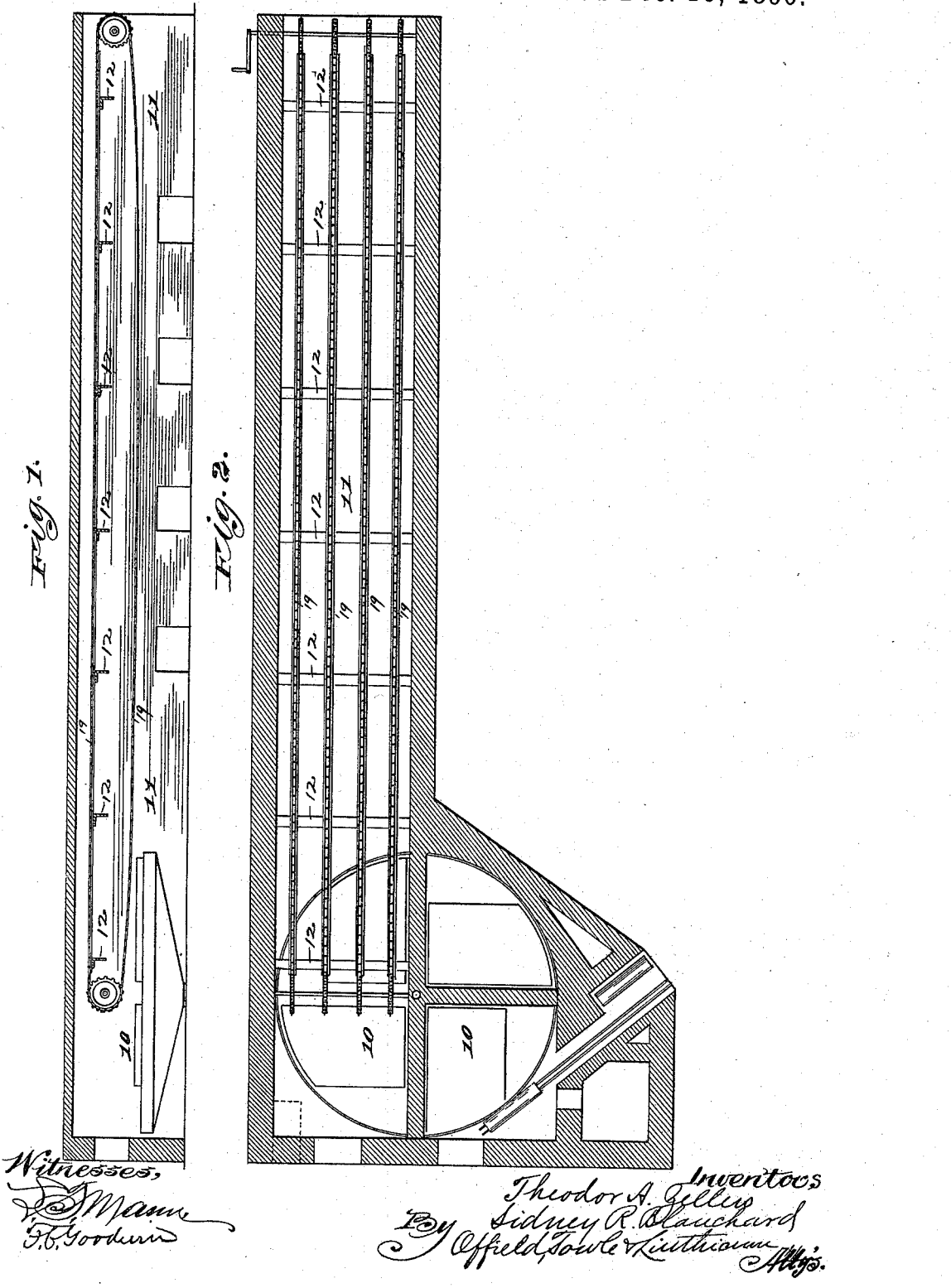

(No Model.) 4 Sheets—Sheet 3.
T. A. ZELLERS & S. R. BLANCHARD.
CONVEYER FOR CARRYING GLASS FROM FLATTENING OVENS.
No. 573,318. Patented Dec. 15, 1896.
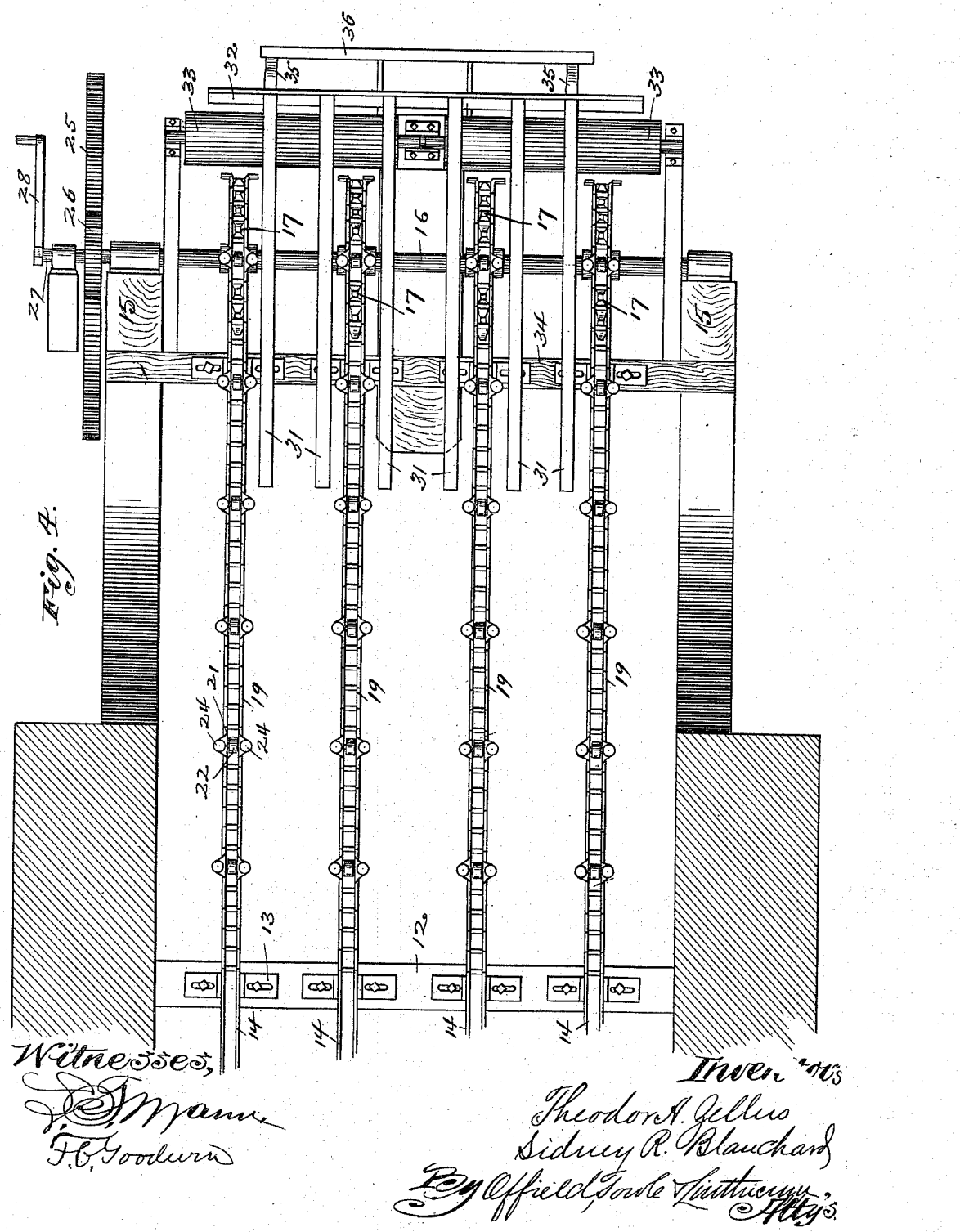

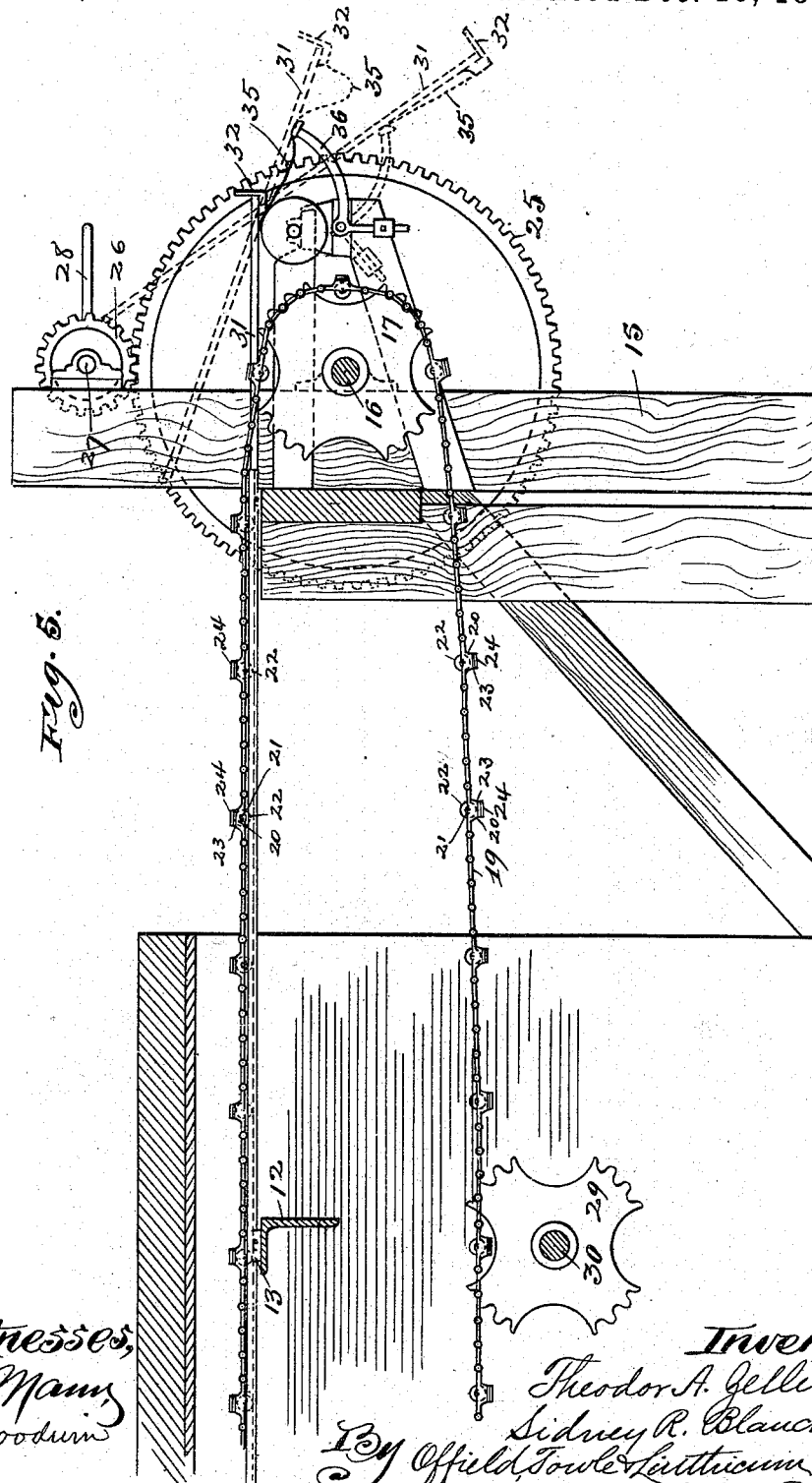

UNITED STATES PATENT OFFICE.

THEODOR A. ZELLERS AND SIDNEY R. BLANCHARD, OF OTTAWA, ILLINOIS, ASSIGNORS TO THE UNITED GLASS COMPANY, OF SYRACUSE, NEW YORK.

CONVEYER FOR CARRYING GLASS FROM FLATTENING-OVENS.

SPECIFICATION forming part of Letters Patent No. 573,318, dated December 15, 1896.

Application filed December 23, 1893. Serial No. 494,572. (No model.)

*To all whom it may concern:*

Be it known that we, THEODOR A. ZELLERS and SIDNEY R. BLANCHARD, of Ottawa, Illinois, have invented certain new and useful Improvements in Carriers for Conveying Glass from Flattening-Ovens, of which the following is a specification.

This invention relates to a carrier for conveying sheets of glass from the flattening-oven of an annealing-furnace through the leer or tunnel.

The improved carrier is composed of a series of endless chains arranged parallel to but independent of each other and turning over sprocket-wheels at the ends of the leer, and supported intermediate the ends by stationary tracks which prevent sagging of the strands of the chains.

It has been proposed prior to the present invention to employ endless-chain carriers, but so far they have not been made successful and various reasons have been assigned for their want of success. After considerable experiment with endless-chain carriers we have succeeded in making them practical and are able to move the sheets of glass through the leer or tunnel with less breakage and more rapidly than by the employment of the reciprocating bars now in general use.

The endless carrier has many features of advantage over the reciprocating bars, and is therefore much to be preferred.

The practical and successful operation of the chain carrier is due to certain features of construction, which may be briefly described as follows: A series of endless chains are turned over sprocket-wheels and extend from the oven through the leer and beyond the outer end thereof. A series of stationary tracks for the upper strands of the chains are arranged within the leer or tunnel, and upon these the carrying-strands bear while supporting the sheets of glass. These tracks are preferably constructed from channel-bars, and the carrying-chains are of the link-belt type and of a peculiar construction, which peculiarity consists mainly in the employment at suitable intervals of links having journaled between the side bars thereof antifriction-rollers which travel or roll upon said tracks, thereby reducing the friction and the power necessary to propel the chains and also preventing the sagging thereof. These roller-links have integral lugs extending in a horizontal plane from the tops of the upper edges of the side bars and forming rests or supports for the sheets of glass. These rests or supports may also be provided with disks or buttons of some non-conducting material, such as asbestos. This particular construction of link with its antifriction-roller is not, however, claimed herein except in combination with said endless-chain carriers and supporting-tracks. The chains are conducted over sprocket-wheels of peculiar construction, and the bearings for these sprockets are so arranged as not to be affected by the heat of the furnace and to be out of the way of the operator in placing the sheets of glass on the carrying-chains.

In the accompanying drawings, Figures 1 and 2 are respectively a vertical section and a sectional plan view of a tunnel or leer including the furnace. Fig. 3 is a sectional plan view through the oven end of the tunnel or leer, showing the latter broken away. Fig. 4 is a plan view, partly in section, of the outer end of the leer and showing the carriers and their driving and supporting mechanisms projected beyond such open end. Fig. 5 is an elevation, partly in section, of the parts shown in Fig. 4. Fig. 7 shows an end view of one of the roller-links. Fig. 8 is a detail view showing means for supporting the sprocket-wheels and showing one of the sprocket-wheels in side elevation. Fig. 9 is a sectional detail view of the supporting-bracket.

In the drawings, 10 represents the flattening-wheel, and 11 the tunnel or leer through which the sheets of glass are conveyed from the wheel. In this tunnel are arranged at suitable intervals the supporting-bars 12, which are placed transversely of the tunnel and have chairs 13 thereon, which support the channel-bars 14, the latter being arranged with their flanges projecting upwardly, forming tracks. On a suitable frame, as 15, beyond the open end of the tunnel, is journaled the shaft 16, carrying sprocket-wheels 17, whose teeth are non-continuous, the teeth being arranged in groups of four or more and separated by intervening smooth or cut-away portions to provide for turning the sections of the links of the chain which carry the rollers. At the inner or oven end of the tunnel, instead of employing a single shaft for mounting the several sprocket-wheels 17, there are provided bracket-supports 18, arranged in pairs and adapted to receive and form bearings for the ends of the short journals 18$^a$. These short journals are not so liable to warp as a single shaft.

The carrying-chains, which are marked 19, are of the link-belt type, except that some of the links are of modified construction, as shown in Fig. 7, and have rectangular open bodies composed of the side or cheek pieces 20, with the transverse pin 21, on which is ortatably mounted antifriction-roller 22. Extending from these cheek-pieces are the lateral lugs 23, on which are secured, by rivets or in any convenient way, the asbestos disks or buttons 24.

The drawings show four of the chains 19, and in the furnace which we have constructed and practically tested the invention we have employed four, but a greater or less number may be employed, and experiments lead to the conclusion that three chains would be sufficient. As a means for operating the chains we have shown shaft 16 extended beyond the framework at one side and provided with the large gear-wheel 25, which is driven by the pinion 26, mounted on a short shaft 27 and provided with a crank 28.

In the practical operation of the device shown six revolutions of the small pinion will move the chains four feet, which results in bringing out one sheet of glass. The chain may of course be operated continuously, but as the operations of flattening and placing the glass upon the carrier at the opposite end of the tunnel require time the action of the carrier may be and is in practice intermittent.

In order to facilitate the removal of the fork by means of which the sheets of glass are placed upon the carrying-chain, we prefer to arrange the supporting-bar 12 at the oven end of the leer below the channel-bars, so that when the sheets of glass are placed the tines of the fork may be withdrawn. The lower or returning strands of the chains may also be supported upon a series of sprocket-wheels 29, loosely mounted upon transverse shafts 30, supported in the side walls of the tunnel or leer. The sheets of glass may be received on the tilting frame shown in Figs. 4 and 5, and which consists of the slats 31, secured with the cross-bar 32. The slats lie loosely on the rollers 33 and cross-timbers 34. This sliding and tilting frame is connected by the straps 35 with the rocking frame 36, which is counterbalanced by the weights 37.

In operation the glass in the form of cylinders, parted or cracked, is introduced into the oven and placed upon the flattening-wheel in the usual way, and after being flattened and brought to the proper position it is placed upon the carrier by the attendant in the usual manner, whereupon the carrier-chains are operated as before mentioned and the sheets of glass conveyed through the tunnel by a series of intermittent movements. During these movements the antifriction-rollers support the upper or conveying strands of the chains by traveling upon the channel-bar tracks 14, thus preventing all sagging of the chains. The sheets of glass rest upon the non-conducting buttons or disks and by the intermittent operation or turning of the chains the glass is conveyed through the tunnel. When a sheet of glass passes out through the open end of the tunnel and impinges upon the upturned ends of the tilting and sliding frame, the next movement of the glass will cause such frame to slide out, resting upon the cross-bar of the rocking frame 36 and gradually tilting, as indicated by the dotted lines in Fig. 5, until it assumes an angular position, when the glass is removed by the attendant. When the tilting frame is relieved from the weight of the glass, the counterbalance-weights restore the rocking frame to its normal position, whereupon the attendant pushes the sliding frame back to its original position.

It will be observed that in the improved construction of leer herein described and shown the upper or carrying strands of the chains conduct the glass through the leer upon the same horizontal plane, so that the glass is not subjected in transit to varying temperatures which might exist at different altitudes in the tunnel. It will also be seen that the upper or carrying strands of the chains pass through the leer near the roof or top thereof. This we have found to be desirable because the glass is removed thereby from the bottom portion of the leer, where incoming currents of cold air are found, and also from the middle portion of the leer, where the hot and cold currents meet. By conveying the glass in the same horizontal plane and through the upper portion of the leer it is not subjected to varying temperatures and breakages consequent thereon. We have also found that the chain-leer, when properly constructed and supported, so that the chains are not permitted to sag throughout any part of the circuit in which they are supporting the glass, results in a very large saving of glass. In the use of bar-leers, even when constructed in the best-known manner, the loss in the breaking of glass is a considerable item.

From practical use of the improved leer we are satisfied that we can reduce the percentage of breaking very materially, and with careful manipulation that no breaking need result from the moving of the glass through the tunnel.

Without limiting our invention to precise details of construction, we claim—

1. A carrier for conveying glass from a flattening-oven through the tunnel or leer, comprising a series of endless link belts or chains, sprocket-wheels journaled at the ends of the tunnel or leer and over which the chains are turned, continuous tracks, one for each chain extending longitudinally through the leer or tunnel and said chains having links some of which have open bodies adapted to engage the sprocket-wheels and other links having side bars antifriction-rollers journaled between said bars and adapted to travel on said track-bars, substantially as described.

2. In a carrier for conveying glass from a flattening-oven through the tunnel or leer, the combination with a series of endless carrying-chains each composed of link belts, said belts having links thereof provided with antifriction-rollers journaled in the side bars of said links, and lugs projecting laterally from the top edges of said side bars to form rests or supports for the sheets of glass and tracks arranged beneath the carrying-strands of the chain and composed of channel-bars in which said antifriction-rollers travel, substantially as described.

3. In a carrier for conveying glass from a flattening-oven, the combination with a series of endless carrying-chains composed of link belts, said belts having at suitable intervals links provided with antifriction-rollers journaled therein, lugs projecting from the side bars of said links, buttons or disks of nonconducting material upon said lugs, and tracks or supports arranged beneath the carrying-strands of the chains and composed of channel-bars in which said antifriction-rollers travel, substantially as described.

THEODOR A. ZELLERS.
SIDNEY R. BLANCHARD.

Witnesses:
C. C. LINTHICUM,
FREDERICK C. GOODWIN.